United States Patent [19]

Mylander

[11] 3,905,689
[45] Sept. 16, 1975

[54] DIRECT OPERATING VALVE
[76] Inventor: Gerald D. Mylander, 1232 W. Collins, Orange, Calif. 92667
[22] Filed: Feb. 28, 1974
[21] Appl. No.: 446,607

[52] U.S. Cl. .................. 251/77; 251/175; 251/357
[51] Int. Cl.² ........................................ F16K 31/06
[58] Field of Search ......... 251/84, 85, 77, 333, 357, 251/175

[56] References Cited
UNITED STATES PATENTS

| 1,789,620 | 1/1931 | Elliott | 251/127 X |
| 3,422,850 | 1/1969 | Caldwell | 251/84 UX |
| 3,534,772 | 10/1970 | Stampfli | 251/85 X |
| 3,549,119 | 12/1970 | Sellers | 251/84 |

FOREIGN PATENTS OR APPLICATIONS

| 1,183,324 | 1/1959 | France | 251/84 |
| 624,357 | 6/1949 | United Kingdom | 251/357 |
| 899,372 | 6/1962 | United Kingdom | 251/357 |

Primary Examiner—Henry T. Klinksiek
Attorney, Agent, or Firm—Allen A. Dicke, Jr.

[57] ABSTRACT

Direct operating solenoid valve has large port area and high lift by employing resilient edge supported seal disc so that as the magnetic armature is moved toward its pole piece by magnetic force, at the first part of the stroke the resilient poppet seal disc is deflected and at the last part of the stroke it is pulled off its port seat. Thus, high lift is achieved with large port diameter.

2 Claims, 4 Drawing Figures

DIRECT OPERATING VALVE

BACKGROUND

This invention is directed to a direct operating valve, and particularly the direct solenoid operated high lift large port valve.

The characteristics of solenoids are such that at the early part of the stroke the force is low, and at the final part of the stroke as the solenoid armature is approaching the fixed pole piece, the force is high. Solenoid operated valves must have valve force characteristics which are compatible with solenoid operating characteristics. In prior art valves, the valve sealing disc has been rigidly fixed to the armature. This means that at the early part of the armature stroke, the armature force must be sufficient to lift the disc off of the port. Now, the port area and the pressure across the valve are seen to be the balancing criteria. With small port area and with operation toward the final end of the armature stroke for greater force, the poppet could be lifted. However, the small port area and the small lift limit the flow. It is recognized with the solenoid characteristics in the prior art fixed valve disc that port area and lift had to be traded off for maximum flow through the open valve. The result was such that in most cases it was found to be more desirable to employ a pilot operated valve poppet, with the solenoid operating a small valve or pilot within the poppet structure which in turn opens and closes the main valve. This results in additional complexity, cost and affects the reliability of operation.

SUMMARY

In order to aid in the understanding of this invention it can be stated in essentially summary form that it is directed to a direct operated solenoid valve which has a valve port and a relatively movable poppet seal. The seal is supported around the edges and is of resilient structure so that in early motion of the armature the poppet seal deflects and in the later portion of armature motion the poppet seal is lifted off of the port, whereupon the seal is restored from the deflected to the undeflected position.

It is thus an object of this invention to provide a direct operated solenoid valve which has the relatively high lift and large port as compared to prior structures. It is a further object to provide a solenoid operated valve which has maximized flow characteristics by providing a relatively large port and high lift as compared to ordinary direct operated valves. It is a further object to provide a direct operated solenoid valve which is economic of construction and of reliable use, while maximizing flow criteria.

Other objects and advantages of this invention will become apparent from a study of the following portion of the specification, the claims and the attached drawings.

DESCRIPTION

Figure 1:
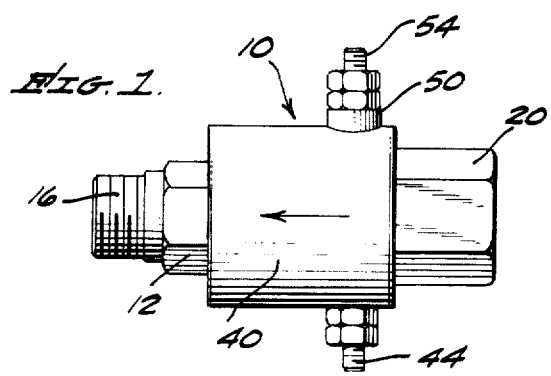
FIG. 1 is a side elevational view of the direct operating valve of this invention.
Figure 2:
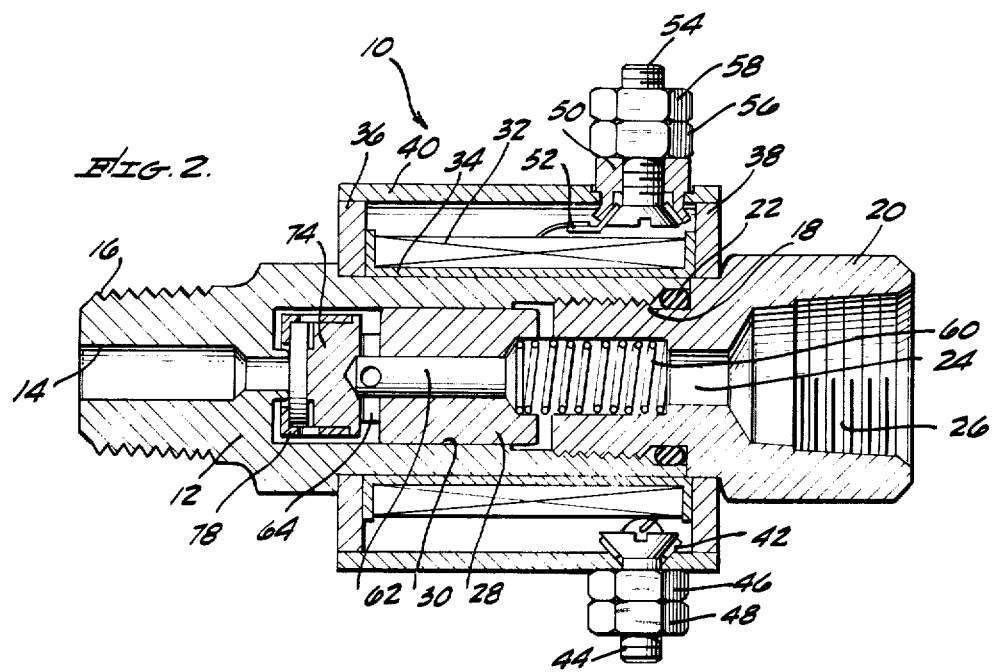
FIG. 2 is a longitudinal section therethrough.

The direct operating valve 10 of this invention is illustrated in side elevation in FIG. 1 and in longitudinal section in FIG. 2. Valve 10 has a body 12 which is provided with an internal flow passage 14 and connection means for connection into a fluid pressure system, such as external pipe thread 16. Of course, other connection means are feasible. Flow passage 14 is the outlet flow passage of valve 10. Body 12 is made of material of low magnetic susceptibility, such as brass. The upstream end of body 12 is provided with connector threads 18. Fitting 20 has its own threads and screws into threads 18. O-ring 22 or other sealing means provides for sealing between fitting 20 and body 12. Fitting 20 is of a material of high magnetic susceptibility, such as steel. Fitting 20 has flow passage 24 therethrough and is provided with fluid system connecting means such as pipe threads 26. Connection 26 and flow passage 24 are the inlet to valve 10.

Armature 28 is slidably mounted in bore 30 in body 12. Armature 28 is of magnetic material such as iron or steel. Solenoid coil 32 is wound on bobbin 34. Bobbin 34 is mounted directly on the exterior of body 12 and is secured between end flanges 36 and 38. The end flanges respectively lie against the shoulder on body 12 and the shoulder on fitting 20 so that the solenoid coil is maintained in place. Case 40 engages around the flanges to close the coil. Solenoid coil 32 has two electrical connections, one at each end of the solenoid coil winding. A conventional electric connector 42, crimped on the wire and having a circular terminal end is connected onto the ground end of the solenoid winding. It is inserted under the head of flathead machine screw 44. The machine screw head draws the connector 42 into the countersunk cone on the interior of case 40. Nut 46 clamps the structure in place while nut 48 is employed for securement of a ground lead between the two nuts. Thus, grounding of the solenoid lead is achieved.

The other lead from solenoid coil 32 is fastened in a similar manner. Tubular insulator 50 is made of resilient material, such as nylon or polytetrafluoroethylene and it is inserted through a hole in case 40. Terminal connector 52 has a circular ring at its outer end and is crimped or soldered to the other end of the wire of solenoid coil 32. The flat head of machine screw 54 engages upon the ring of connector 52 and engages it into the collar of insulator 50. The ring and the collar are forced outward into conical shape so that the tubular insulator firmly engages in the hole in case 40 and anchors all the structure together. Nut 56 holds together the structure of the terminal connector, tubular insulator, case, machine screw and nut, while nut 58 provides for lead attachment.

It can be seen that when the coil is energized there is a closed magnetic path from the coil through fitting 20 to armature 28. The path then passes through the side wall of brass fiting 12 back to the coil. Thus, with energization of the solenoid coil, armature 28 is urged to the right to draw it against the left face of fitting 20. Compression spring 60 urges the armature to the left. The spring is of sufficient strength as to overcome friction in moving the armature to the left, but should be of minimum force. Spring 60 is seated in counterbores in both fitting 20 and armature 28, so that it does not prevent the movement of armature 28 to the right or valve-open position where it is in physical face-to-face contact with fitting 20.

The flow path through the valve is through the inlet connection provided by threads 26, and thence through flow passage 24. Flow then continues through its passage through the interior of spring 60 to central bore 62. Cross bores 64 interconnect the bore 62 with the exterior of the armature at its valve end. The body of armature 28 closely engages in bore 30 to minimize the length of the low permeability path in the magnetic circuit. For this reason, the bore 62 carries the fluid through the interior of the body of the armature. The valve end of the armature, however, is reduced in diameter so that flow can pass out through cross bore 64 and around head 74, still within body bore 30.

Figure 3:
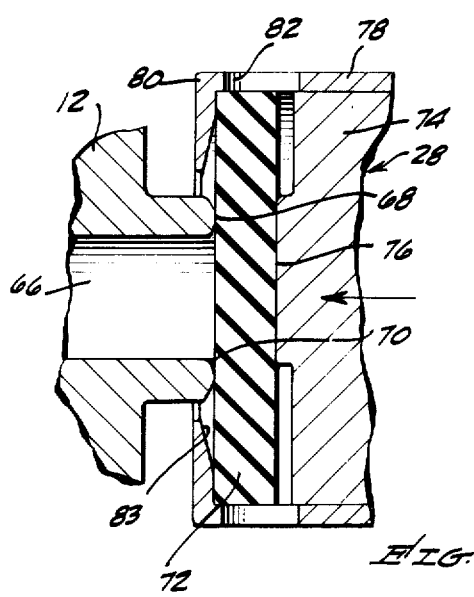
FIG. 3 is a further enlarged section, with parts broken away, showing the valve in the closed position.
Figure 4:
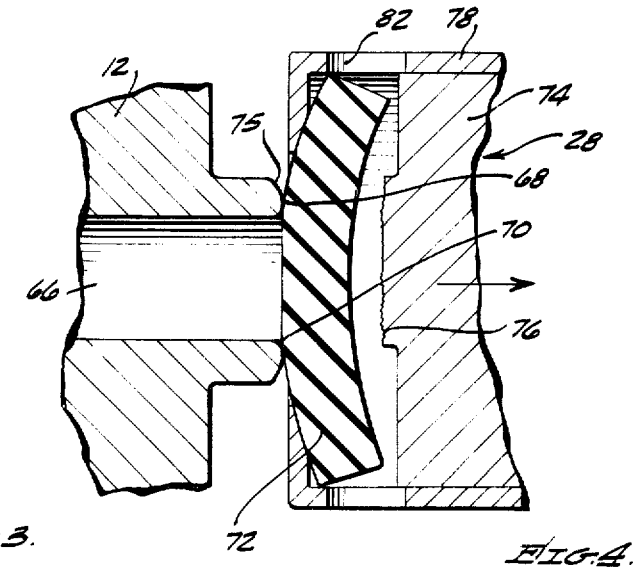
FIG. 4 is a view similar to FIG. 3, showing the valve part way through its opening stroke, with the poppet seal about to lift off of the port.

FIGS. 3 and 4 illustrate the critical portion of this invention in more detail. Fluid passage 14 in body 12 terminates in orifice 66. Valve seat 68 is formed around the face of this orifice. Valve seat 68 joins orifice 66 in a small radius 70 to minimize cutting of valve disc 72. The outer portion of valve seat 68 is tapered away to provide a cone 75. In this way, the flat portion of seat 68 is minimized.

Head 74 of armature 28 is of reduced diameter within bore 30 to permit flow passage therearound. The front of head 74 carries boss 76 which is of about the same diameter as the protuberant part of body 12 which carries valve seat 68. The face of boss 76 has channels thereacross, in the form of scratches or grooves which prevent valve disc 72 from sticking to it. There are no suction adhesive characteristics between those two parts. Cap 78 is of tubular cylindrical character and is secured onto the exterior of head 74, such as by being pressed thereon. Cap 78 has an inwardly directed front flange 80. The frontal opening in flange 80 embraces around the protuberance upon which valve seat 68 is formed, such as is seen in FIGS. 2 and 3. Openings 82 in the side of cap 78 permit fluid passage entry into the space between head 74 and valve disc 72.

Valve disc 72 is a flat disc of cylindrical outline and is made of resilient material. Modern synthetic rubber-like compounds are usually suitable for this service, and with a tough compound, reinforcement is usually unnecessary. Valve disc 72 lies within the embrace of front flange 80 so that it is constrained on the front end of head 74.

In operation, without electrical energization of the solenoid coil, spring 60 urges armature 28 to the left so that valve disc 72 lies on valve seat 68, as shown in FIG. 3. With pressure applied toward the left, the pressure applies a sealing force which is the product of the pressure times the area of orifice 66.

With energization of the solenoid, solenoid coil 32 applies a force to armature 28 in the opening direction, to the right as seen in FIG. 2. In the prior art structures, the valve disc has been rigidly mounted, and thus the armature force would have to exceed the sealing force, with the starting long-air gap. In the present case, however, the solenoid force does not initially cause unseating, but starts with deflection of valve disc 72. FIG. 3 illustrates the sealed position, and FIG. 4 illustrates the position after the armature 28 is moved some distance toward the face of fitting 20. Valve disc 72 is deflected from its normally flat position to the curved or conical position. Boss 76 is pulled away from valve disc 72, there being no adhesive suction therebetween. Front flange 80 has conically beveled interior face 83 which permits the valve disc to achieve an even more flexed position. As is seen in FIG. 4, armature 28 has moved a considerable distance without unseating valve disc 72. The distance moved is the distance in FIG. 4 between boss 76 and valve disc 72. This distance is also seen at the sealing face of the valve disc, as compared to front flange 80. This motion of the armature has brought it closer to the face of fitting 20. As previously discussed, solenoid force goes up as the air gap is decreased, toward the end of armature stroke. Now, this increased armature force is employed to lift valve disc 72 off of valve seat 68. The structure is designed so that in this condition, the armature force can overcome the sealing force. Thus, valve disc 72 is lifted away from seat 68 and the valve is opened. As soon as it is open, the fluid flow forces act through the armature bore 62 and cross bore 64, and around head 74. However, these dynamic fluid forces are less than the sealing force so that the armature reduces its air gap to zero, with armature lying directly against fitting 20. As the valve disc 72 leaves the valve seat, the valve disc returns to its flat condition, due to its internal resiliency. Thus large separation is achieved between the sealing face of valve disc 72 and seat 68. Thus, large flow passage is formed therebetween, compatible with the size of orifice 66. Thus, the disc is permitted to deflect during the early part of the armature stroke, and is lifted off of the seat in the final part of the armature stroke, followed by return of the disc to a position on the armature corresponding to the sealed position, to provide maximum lift. Thus, a direct operating valve without pilot structure achieves high lift and maximized flow.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

I claim:

1. A directly operating solenoid valve comprising:
   a valve having a body, an armature movably mounted within said body from a first position to a second position, a solenoid coil around said body for magnetically urging said armature from its first position toward its second position, a seat within said body having an orifice therethrough for the passage of fluid, the improvement comprising:
   a valve disc of resilient material within said body for movement with respect to said seat, said valve disc having a sealing surface for sealing with respect to said seat when said armature is in its first position, said valve disc being substantially circular, a cap having an inwardly directed circular cap flange having a conically beveled inner face directed toward said disc to permit deflection of said resilient valve disc, said cap being secured on said armature so that, as said armature moves from its first position where said disc is on said seat toward its second position, said cap urges the edges of said disc toward said second position, said armature having a head thereon directed toward said seat, a boss on said head facing said seat, said boss being positioned inwardly from said cap flange so that the center of said valve disc normally lies against said boss and said valve disc is unsupported on the side opposite said cap flange so that, as said armature moves, said edges of said valve disc toward its second position and fluid pressure toward said seat holds the center of said resilient valve disc in said seat so that the center of said disc leaves said boss and the outer edges of said valve disc turn into the space beside said boss to leave free said edges of said valve disc with resilient bending of said valve disc being limited by said conically beveled inner face of said inwardly directed circular cap flange and so that, upon separation of said valve disc from its seat, said valve disc resiliently returns to its undeflected position when said armature is in the second position to maximize flow area between said valve disc and said valve seat.

2. The direct operating solenoid valve of claim 1 wherein said boss has a roughened surface to prevent suction adhesion of said valve disc on said boss.

* * * * *